US006876410B2

(12) United States Patent
Kawata

(10) Patent No.: US 6,876,410 B2
(45) Date of Patent: Apr. 5, 2005

(54) PORTABLE INFORMATION APPARATUS AND FILM LIQUID CRYSTAL DEVICE

(75) Inventor: Masayuki Kawata, Chiba (JP)

(73) Assignee: Seiko Instruments Inc., Chiba (JP)

( * ) Notice: Subject to any disclaimer, the term of this patent is extended or adjusted under 35 U.S.C. 154(b) by 142 days.

(21) Appl. No.: 10/033,583

(22) Filed: Dec. 20, 2001

(65) Prior Publication Data

US 2002/0093602 A1 Jul. 18, 2002

(30) Foreign Application Priority Data

Dec. 21, 2000 (JP) .................................... 2000-389109
Dec. 6, 2001 (JP) .................................... 2001-372129

(51) Int. Cl.⁷ .................... G02F 1/1333; G02F 1/1339
(52) U.S. Cl. ........................................ 349/60; 349/154
(58) Field of Search ......................... 349/58, 60, 153, 349/154, 158

(56) References Cited

U.S. PATENT DOCUMENTS 5,307,190 A * 4/1994 Wakita et al. ............... 349/158

FOREIGN PATENT DOCUMENTS

| EP | 1045271 | | 10/2000 | |
| JP | 403168618 A | * | 7/1991 | G02F/1/1333 |
| JP | 6160820 | | 6/1994 | |

OTHER PUBLICATIONS

Patent Abstracts of Japan, vol. 008, No. 271 (P–320), Dec. 12, 1984, publication No. 59139019, publication date Aug. 9, 1984.

Patent Abstracts of Japan, vol. 015, No. 415 (P–1265), Oct. 22, 1991, publication No. 03168618, publication date Jul. 22, 1991.

Patent Abstracts of Japan, vol. 018, No. 481 (P–1797), Sep. 7, 1994, publication No. 06160820, publication date Jun. 7, 1994.

* cited by examiner

Primary Examiner—Nathan J. Flynn
Assistant Examiner—Johannes Mondt
(74) Attorney, Agent, or Firm—Adams & Wilks

(57) ABSTRACT

A portable information apparatus has a film liquid crystal device having a pair of flexible substrates spaced apart from one another to define therebetween a gap containing liquid crystal, first surface portions having a curved cross-section, engagement portions extending from respective ones of the first surface portions, and at least one second surface portion having a planar cross-section. An injection port is formed in the at least one second surface portion and through which the liquid crystal is injected into the gap. A sealing portion is disposed on the at least one second surface portion for sealing the injection port. A holding structure has a first holding member and a second holding member for holding the film liquid crystal device in a curved state while the at least one second surface portion of the film liquid crystal device remains planar in cross-section and while the first holding member engages the engagement portions of the liquid crystal device.

12 Claims, 7 Drawing Sheets

PORTABLE INFORMATION APPARATUS AND FILM LIQUID CRYSTAL DEVICE

BACKGROUND OF THE INVENTION

1. Field of the Invention

The present invention relates to a technique for displaying information using a film liquid crystal device. More particularly, the invention relates to a portable information apparatus such as an electronic clock or a portable telephone in which the position of a sealing portion is devised to make a film liquid crystal device easy to be curved so as not to exert any adverse influences on the gap.

2. Description of the Prior Art

In recent years, many film liquid crystal devices have been used in electronic information apparatuses such as an electronic clock. Though these film liquid crystal devices have an advantage in that the degree of freedom of the arrangement is high as compared with conventional liquid crystal display devices employing a hard glass substrate, they also have a disadvantage in that when being bent, they are broken easily so that the displayed information becomes difficult to be looked at. For this reason, heretofore, various kinds of devices have been made with respect to the mounting structures of the film liquid crystal devices.

FIG. 9 is a cross sectional view showing the mounting structure of a conventional film liquid crystal device. The mounting structure of this film liquid crystal device is disclosed in Japanese Patent Application Laid Open No. Hei 6-160820, and has a structure in which an upper surface of a housing 51 is formed into a curved surface 52, and a film liquid crystal device 53 is laid along the curved surface 52. Reference numeral 55 denotes a back cover, and reference numeral 56 designates a circuit block. The periphery of the film liquid crystal device 53 is urged towards the curved surface 52 by a pressure member 54 having elasticity. As a result, the whole film liquid crystal device 53 comes into contact with the curved surface 52 of the housing 51 to be curvedly fixed along the curved surface 52.

Recently, from a viewpoint of the design, the film liquid crystal device having the liquid crystal display portion which is formed into a deformed elliptical shape as well as the film liquid crystal device having the liquid crystal display portion which is formed into a curved rectangular shape have achieved popularity. In such a case, if the film liquid crystal device having the shape of this sort is curved, there arise the following problems due to the sealing portion of the liquid crystal. That is, since normally, the sealing portion of the liquid crystal has the structure in which a liquid crystal injection port(s) is(are) closed by solder, adhesive agent or the like, it is hardly deformed as compared with the flexible substrate constituting the film liquid crystal. For this reason, there arises a problem in that the gap in the vicinity of the sealing portion becomes ununiform. In addition, there also arises a problem in that the film liquid crystal device is hardly curved. Further, in the mounting structure as in the prior art, when the film liquid crystal device is curved, a relatively simple deformation as in the rectangular film liquid crystal device 53 is not generated, but the deformation becomes complicated depending on the shape. As a result, it becomes difficult to estimate a planar dislocation. For this reason, there arises a problem in that when the film liquid crystal device is mounted, the positioning thereof becomes difficult.

SUMMARY OF THE INVENTION

According to the present invention, there is provided a portable information apparatus including: a film liquid crystal device in which liquid crystal is injected into a space defined between flexible substrates and an injection portion for the liquid crystal is sealed; arc portions in each of which the cross section of the film liquid crystal device has a curvature when a part of the film liquid crystal device is curved with a curvature axis as the vertex; a straight line portion in which the cross section of the film liquid crystal device does not have a curvature when a part of the film liquid crystal device is curved with the curvature axis as the vertex; and a sealing portion formed in the straight line portion for sealing the injection port is sealed. With this structure, even when the film liquid crystal device is curved, it is prevented that the curvature is impeded by the sealing portion, and the gap becomes ununiform due to the provision of the sealing portion. In addition, according to the present invention, there is provided a portable information apparatus including: a film liquid crystal device in which liquid crystal is injected into the space defined between flexible substrates and an injection port for the liquid crystal is sealed; arc portions in each of which the cross section of the film liquid crystal device has a curvature when a part of the film liquid crystal device is curved with a curvature axis as the vertex; a straight line portion in which the cross section of the film liquid crystal device does not have a curvature when a part of the film liquid crystal device is curved with a curvature axis as the vertex; and a connection terminal portion through which the film liquid crystal device is connected to the straight line portion. In accordance with this portable information apparatus, even when the film liquid crystal device is curved, the connection terminal portion is not curved. Therefore, the connection terminal portion can be stably connected.

In addition, the portable information apparatus according to the present invention has a connection terminal portion to which the film liquid crystal device is connected, and the connection terminal portion is provided in the straight line portion. In accordance with this portable information apparatus, it is prevented that the curvature is impeded by the sealing portion and the gap becomes ununiform due to the provision of the sealing portion, and also the connection of the connection terminal portion can be stably carried out.

In addition, the portable information apparatus according to the present invention has a first holding member and a second holding member for holding the film liquid crystal device with being curved, and at least two or more engagement portions each of which is located in the associated one of top portions of the curved surface of the film liquid crystal device for carrying out the engagement against the first holding member, and which are provided in the associated one of the top portions of the curved surfaces.

In addition, in accordance with the portable information apparatus of the present invention, the first holding member holds the film liquid crystal device with being curved by a stepped portion of the first holding member.

In addition, in accordance with the portable information apparatus of the present invention, at least two or more projection portions are respectively provided in the top portions of the curved surfaces when the film liquid crystal device is curved to be held, and the first holding member has a trench portion with which the projection portions mate and through which the peripheral portion of the film liquid crystal device is fitted to an attachment portion formed on a cylinder curved surface to curve and hold the film liquid crystal device.

Also, according to the present invention, there is provided a film liquid crystal device including: a arc portion the cross section of which has a curvature when a part thereof is curved with a curvature axis as the vertex; a straight line portion in which the cross section of the liquid crystal device does not have a curvature when a part thereof is curved with the curvature axis as the vertex; and a sealing portion for sealing the injection portion in the straight line portion. With this structure, even when the film liquid crystal device is curved, it is prevented that the curvature is impeded by the sealing portion and also the gap becomes ununiform due to the provision of the sealing portion.

Such a structure can be applied to the case where the shape of the film liquid crystal device has various kinds of shapes as well as the case where the shape of the film liquid crystal device has a rectangular shape. For example, if the film liquid crystal device has a rectangular shape, the sealing portion may be provided in the straight line portion parallel with the curvature axis, whereas if the film liquid crystal device has a shape which is asymmetrical with respect to the curvature axis and which is formed by the straight part and the arc portion, the sealing portion may be provided in the straight line portion which is substantially parallel with the curvature axis. In addition, since the reason that the sealing portion is provided to be roughly parallel with the curvature axis is because the influence of the curvature of the film liquid crystal device is hardly substantially exerted thereon, this structure includes both of the case where the sealing portion is slightly inclined with respect to the curvature axis of the peripheral portion and the case where the peripheral portion is slightly formed into a circular shape.

BRIEF DESCRIPTION OF THE DRAWINGS

A preferred form of the present invention is illustrated in the accompanying drawings in which.

DETAILED DESCRIPTION OF THE PREFERRED EMBODIMENTS

The present invention will be described in detail with reference to the accompanying drawings. Note that the present invention is not construed as being limited to the embodiments.

First Embodiment

Figure 1:
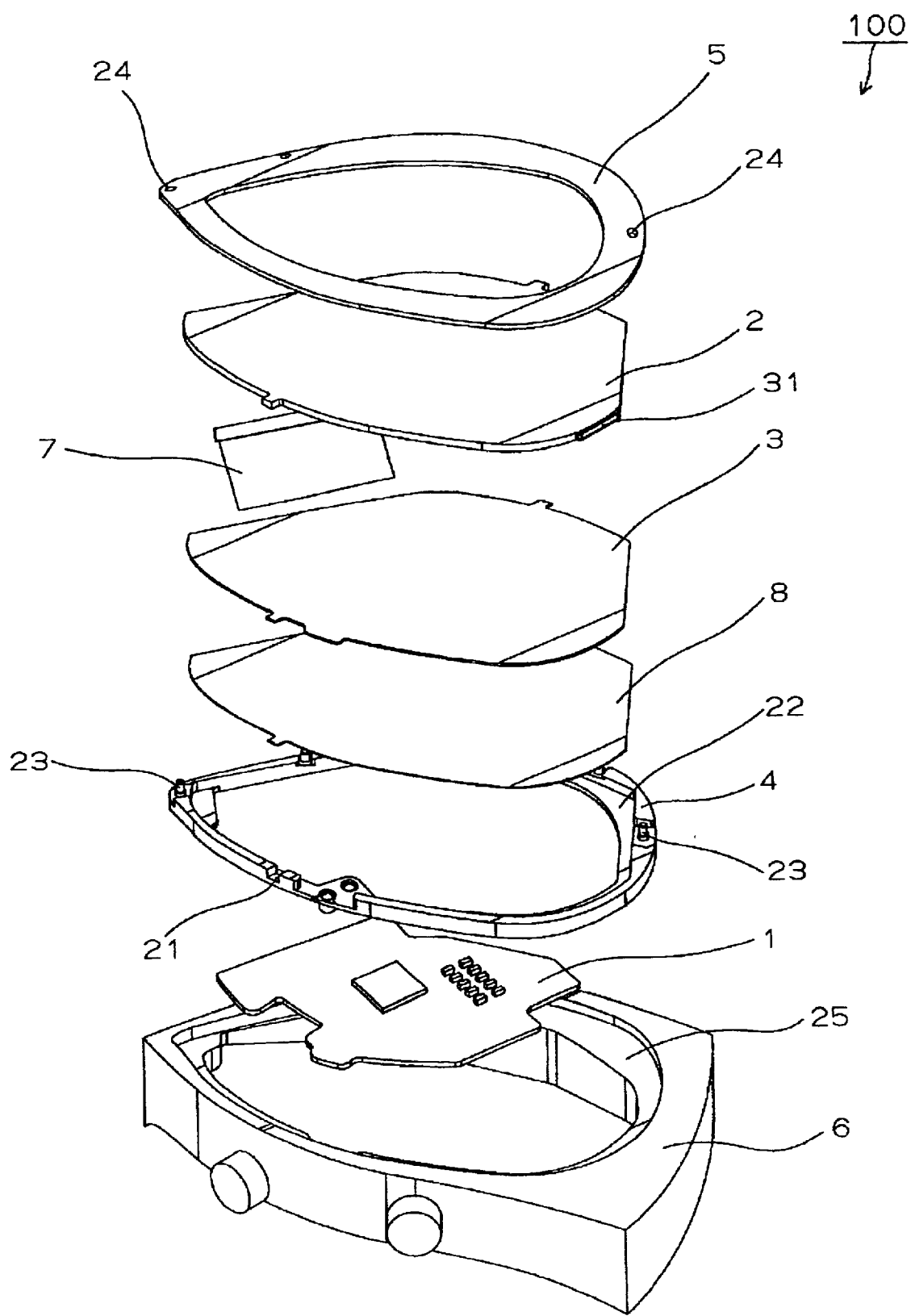
FIG. 1 is an assembly view showing a portable information apparatus according to a first embodiment of the present invention.

FIG. 1 is an assembly view showing the structure of a portable information apparatus according to a first embodiment of the present invention. This portable information apparatus 100 includes: a circuit block 1 having a quartz resonator, a frequency division circuit and the like; a film liquid crystal device 2 having a deformed elliptical shape; an EL panel 3 serving as a back-light for the film liquid crystal device 2; a first holding member 4 and a second holding member 5 for holding the film liquid crystal device 2 and the EL panel 3; and a case 6 for receiving therein these constituent elements. The film liquid crystal device 2 is electrically connected to the circuit block 1 through a conductive member 7. In addition, a gap is formed between the film liquid crystal device 2 and the first holding member 4. Also, there is provided a wear plate 8 which has at least two or more projection portions in the positions facing the top portion of the curved surfaces of the film liquid crystal device 2, which mates with a trench portion of the first holding member 4, which urges the film liquid crystal device 2 against the second holding member 5 by the repulsion force due to the contact of the film liquid crystal device 2 with a stepped portion of the first holding member 4 and which is adapted to make uniform the stress to be applied to the film liquid crystal device 2.

Figure 2:
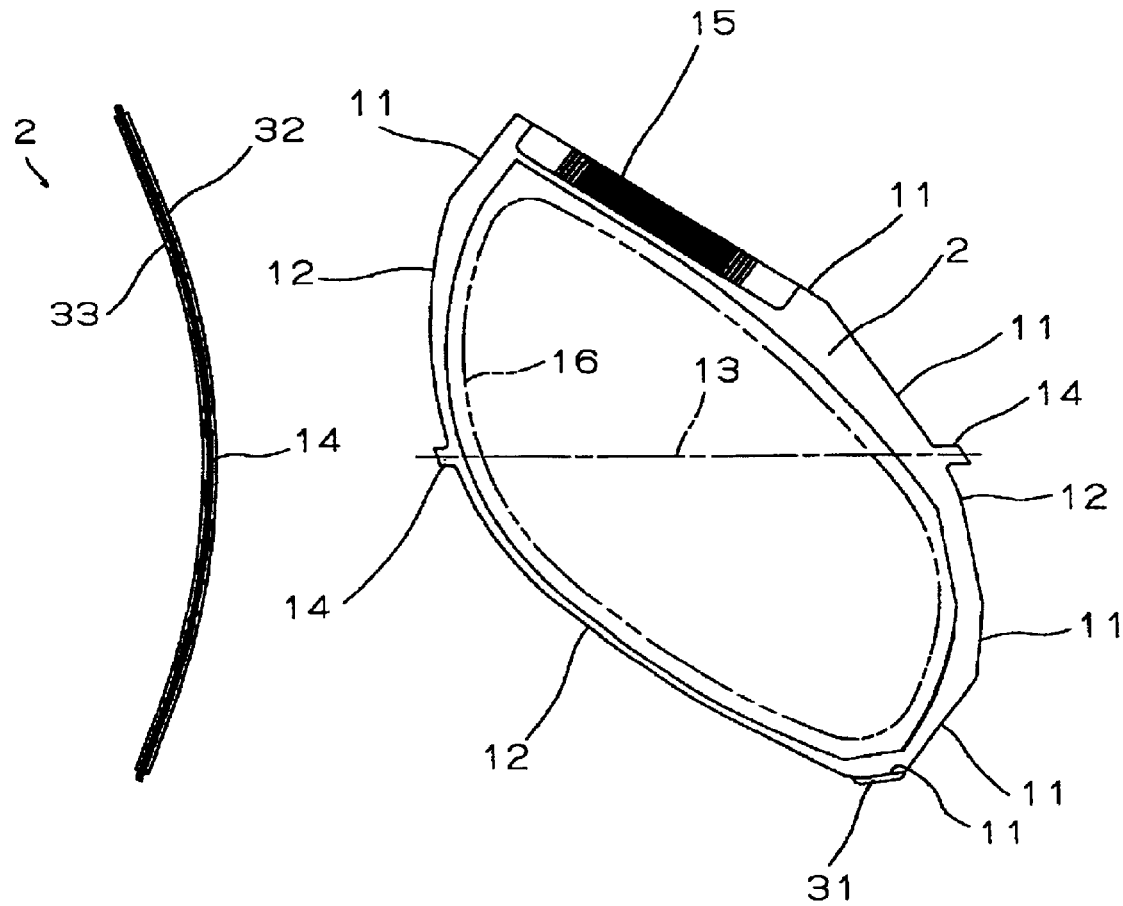
FIGS. 2 are views explaining a film liquid crystal device shown in FIG. 1.
Figure 3:
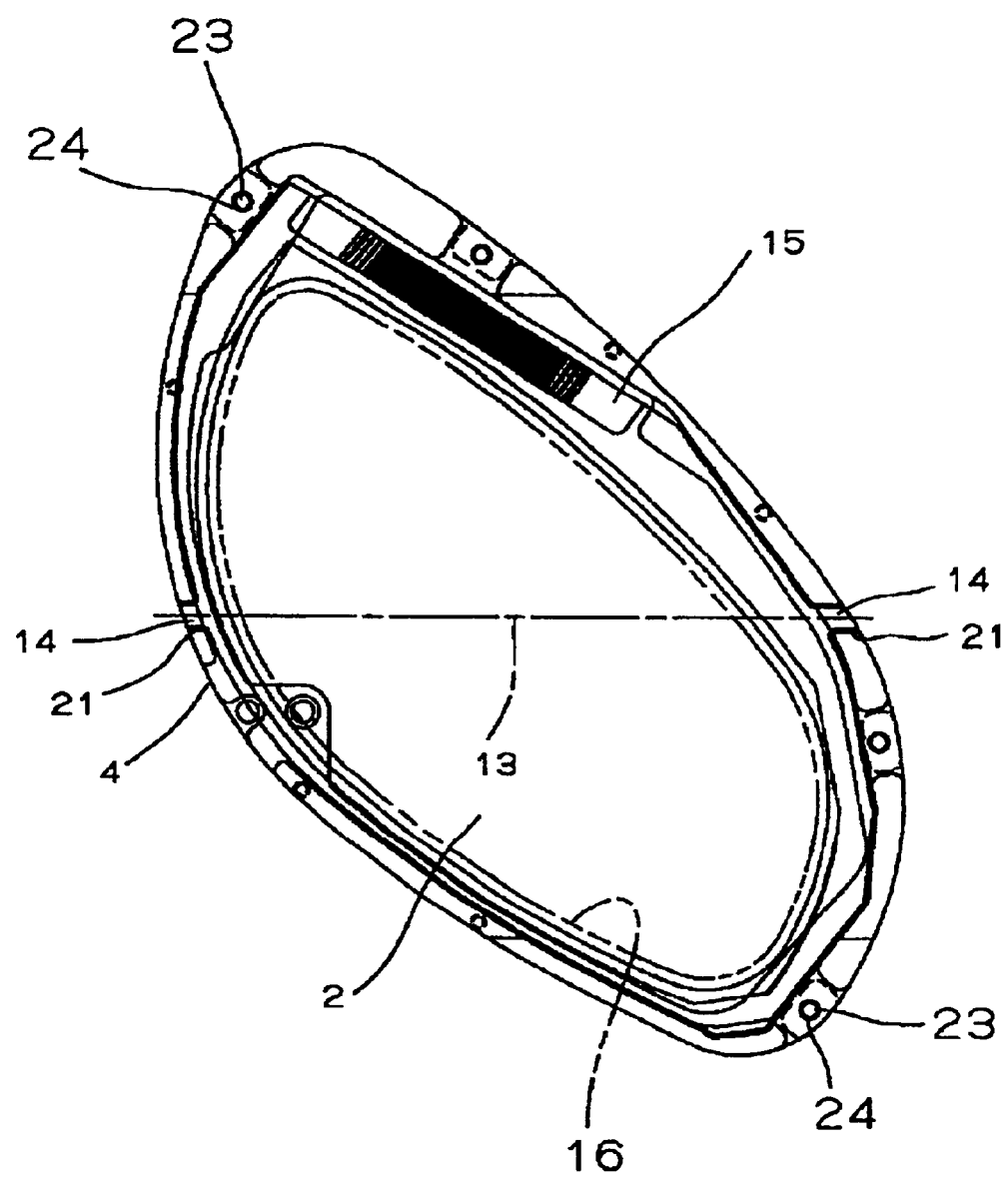
FIG. 3 is a plan view showing a state in which the film liquid crystal device is held between a first holding member and a second holding member.

FIG. 2 is a view for explaining the structure of the film liquid crystal device shown in FIG. 1. FIG. 2A is a plan view and FIG. 2B is a side elevational view. FIG. 3 is a plan view showing the state in which the film liquid crystal device is held between the first holding member and the second holding member. This film liquid crystal device 2 has a curved shape having arc portions 12 (oblique line portions in FIG. 2) consisting of surface portions having a curved cross-section in which the curvature axis is the vertex and two tangential line portions 11 corresponding to the respective arc portions 12 and consisting of surface portions having a planar cross-section. The film liquid crystal device 2 also has projection portions 14 which are formed at the portions which are the top portions of the curved surfaces 12 (indicated by a dashed line 13 in the figure). A connection terminal 15 is formed in one of the tangential line portions 11 of the film liquid crystal device 2, and this connection terminal 15 and a terminal of the conductive member 7 are pressure-bonded to be electrically joined to each other. Note that, in the figures, a two-dot chain line 16 exhibits a displayable area of the film liquid crystal device 2 (hereinafter, referred to as "an active area").

Figure 4:
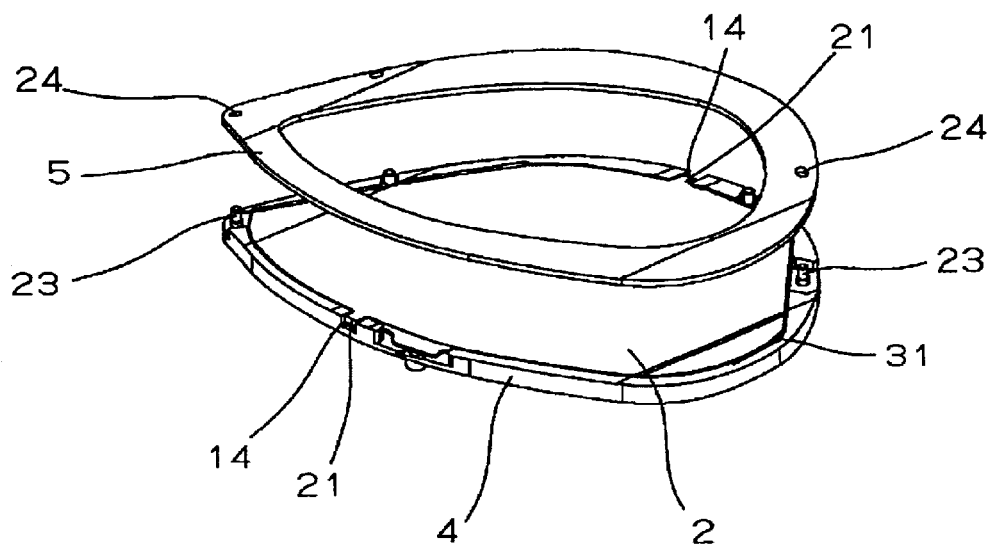
FIG. 4 is a perspective view showing a state in which the film liquid crystal device is fitted in the first holding member.

In addition, trench portions 21 corresponding to the projection portions 14 are formed in the first holding member 4 as well. Then, as shown in FIG. 4, the projection portions 14 and the trench portions 21 mate with each other to engage the film liquid crystal device 2 with the first holding member 4, thereby enabling the positioning thereof. While the film liquid crystal device 2 has a substantially elliptical shape and thus when being curved into the cylinder shaped-face to be incorporated, the complicated stress corresponding to the shape is exerted thereon to cause a planar dislocation in the film liquid crystal device 2, the projection portions 14 mate with the trench portions 21 to carry out the positioning, whereby it becomes possible that the above-mentioned planar dislocation is prevented to readily incorporate the film liquid crystal device 2 in a predetermined position. During the incorporation, the film liquid crystal device has only to be curved with those projection portions being held. With such a structure, it is possible to prevent the positional dislocation of the active area 16 during the incorporation.

Figure 5:
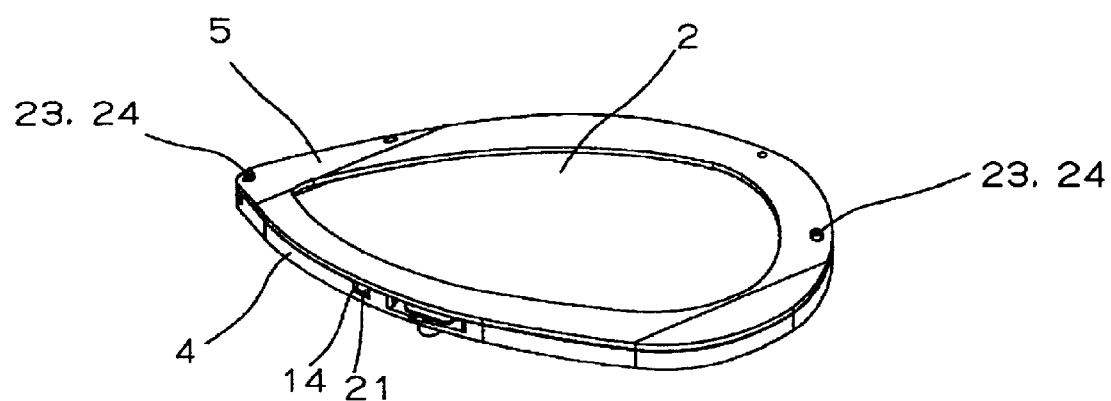
FIG. 5 is a perspective view showing a state in which the film liquid crystal device is held between the first holding member and the second holding member.

In addition, each of the first holding member 4 and the second holding member 5 has a circular shape which is fitted to the shape of the film liquid crystal device 2. A stepped portion 22 in which the film liquid crystal device 2 and the EL panel 3 are to be fitted is formed in the first holding member 4. On the other hand, the second holding member 5 has a circular plate structure. In addition, projections 23 through which the second holding member 5 is to be fixed are provided in the periphery of the first holding member 4. Those projections 23 are inserted into fixing holes 24 of the second holding member 5, respectively, to fix the second holding member 5 by an interference fit, a thermal caulking or the like. As a result, the first holding member 4 and the second holding member 5 can be fixed to each other as shown in FIG. 5. In addition, the first holding member 4 is fitted in an attachment portion 25, which is formed into a stepped shape in the case 6, to be fixed. The first and second holding members define a holding structure for holding the film liquid crystal device 2 in a curved state.

Next, one of the tangential line portion 11 of the film liquid crystal device 2 is provided with a sealing portion 31 for the liquid crystal. The sealing portion 31 has the structure in which an injection port portion through which the liquid crystal is injected into the space defined between an upper flexible substrate 32 and a lower flexible substrate 33 is sealed with an adhesive agent or the like. The reason that the sealing portion 31 is provided in the associated one of the tangential line portions 11 is because when the film liquid crystal device 2 is curved to be incorporated therein, it is possible to hold the generation of the cell gap nonuniformity of the liquid crystal due to the provision of the sealing portion 31 to a minimum. If the film liquid crystal device 2 is intended to be curved, since the sealing portion 31 becomes very hard as compared with other parts, the gap will become ununiform due to the provision of the sealing portion 31. In addition, in the case where the sealing portion 31 is provided in the associated one of the arc portions 12, the portion having the high stress/applied thereto and the part having the low stress applied thereto are generated when the film liquid crystal device 2 is curved, likewise, the cell gap ununiformity of the liquid crystal is caused. Furthermore, the film liquid crystal device 2 comes to be difficult to curve. Therefore, more preferably, the sealing portion 31 is provided in the portions which is not curved in the tangential line parts 11.

In addition, the periphery of the film liquid crystal device 2 is held between the first holding member 4 and the second holding member 5. In order to absorb the gap which is caused due to the dispersion in the part accuracy with respect to the film liquid crystal device 2, the first holding member 4 and the second holding member 5, the wear plate 8 is provided between the first holding member 4 and the second holding member 5. As for the wear plate 8, there is provided the wear plate 8 which urges the film liquid crystal device 2 against the second holding member 5 by the repulsion force generated due to the contact of the film liquid crystal device 2 with the stepped portion 22 of the first holding member 4. As a result, the periphery of the film liquid crystal device 2 can be reliably held. In addition, the wear plate 8 is in non-contact with the lower face of the film liquid crystal device 2. Note that, preferably, the wear plate 8 is formed of a sheet-like polyester film, a metallic thin plate or the like. The lower face of the film liquid crystal device 2 is held in the non-contact state. While the film liquid crystal device 2 is deformed into a saddle shape in the state of being curved, since the lower face of the film liquid crystal device 2 is held in the non-contact state, it is possible to suppress the gap difference which is generated between the central portion and the peripheral portion. For this reason, it is possible to prevent the liquid crystal display from becoming difficult to be looked at the the central portion of the film liquid crystal device 2. Further, during the incorporation or in use, the film liquid crystal device is not damaged at all.

Figure 6:
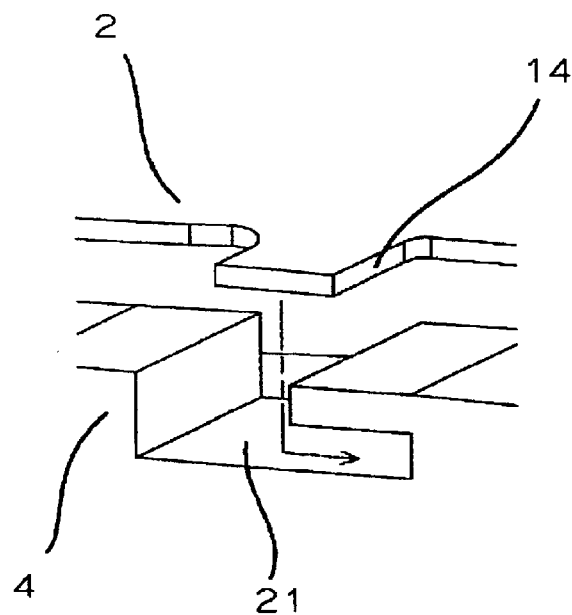
FIG. 6 is a view explaining a modification of an incorporation structure.

Note that, it goes without saying that in the above-mentioned structure, recess parts or hole parts are provided in the film liquid crystal device 2 and projection portions which is to be fitted therein are provided in the first holding member 4 (or the second holding member 5), whereby the positioning thereof can be carried out (the illustration thereof is omitted). Furthermore, as shown in FIG. 6, the above-mentioned trench portion 21 may also be formed into a key shape in cross section. In this case, the projection portion 14 is fitted in the trench portion 21 to be shifted to one side, whereby the film liquid crystal device 2 can be temporarily fixed.

Figure 7:
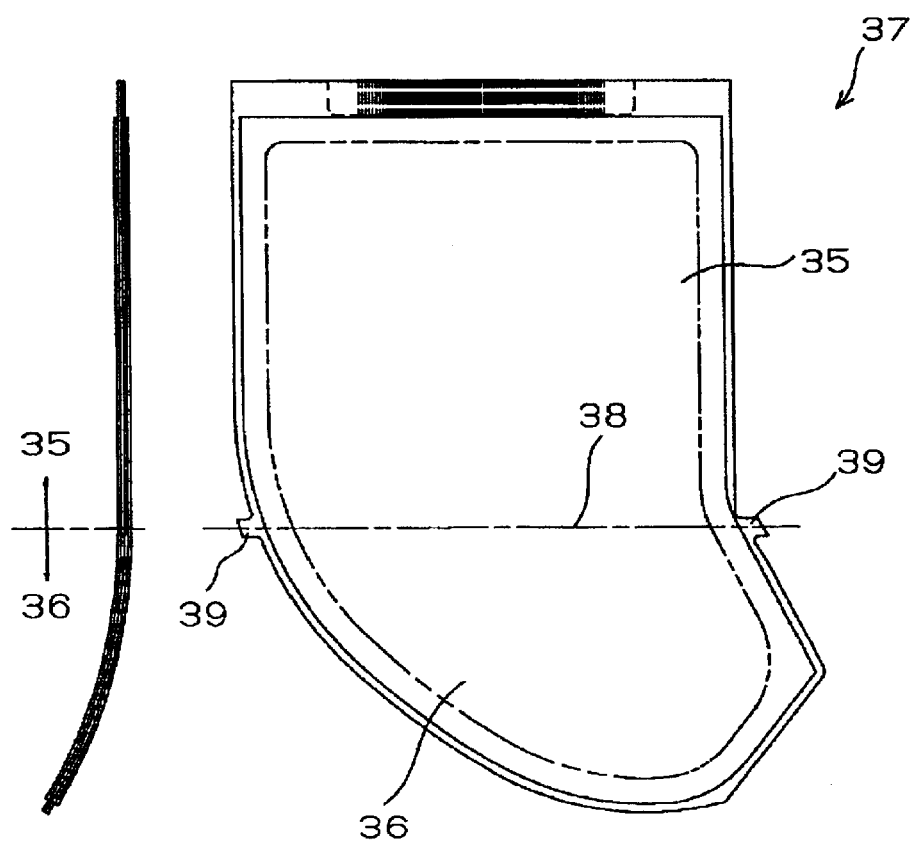
FIGS. 7 are views explaining a modification of a film liquid crystal device.

In addition, the above-mentioned invention can also be applied to the film liquid crystal device 2 only a part of which is curved. As shown in FIGS. 7, even in the case of a film liquid crystal device 37 having a flat plane portion 35 and a curved surface portion 36, projection portions 39 are formed in top portion 38 of the curved surfaces, whereby the incorporation of the film liquid crystal device 37 can be readily carried out. In addition, the projection portions may also be formed in the plane portion 35. Furthermore, as for the shape of the film liquid crystal device, the film liquid crystal device having an asymmetrical shape which is hardly positioned when the film liquid crystal device is curved to be held may be available, and in addition to the film liquid crystal devices illustrated in the above figures, the film liquid crystal device having a potbellied shape, a crescent shape or the like may also be available.

Second Embodiment

Figure 8:
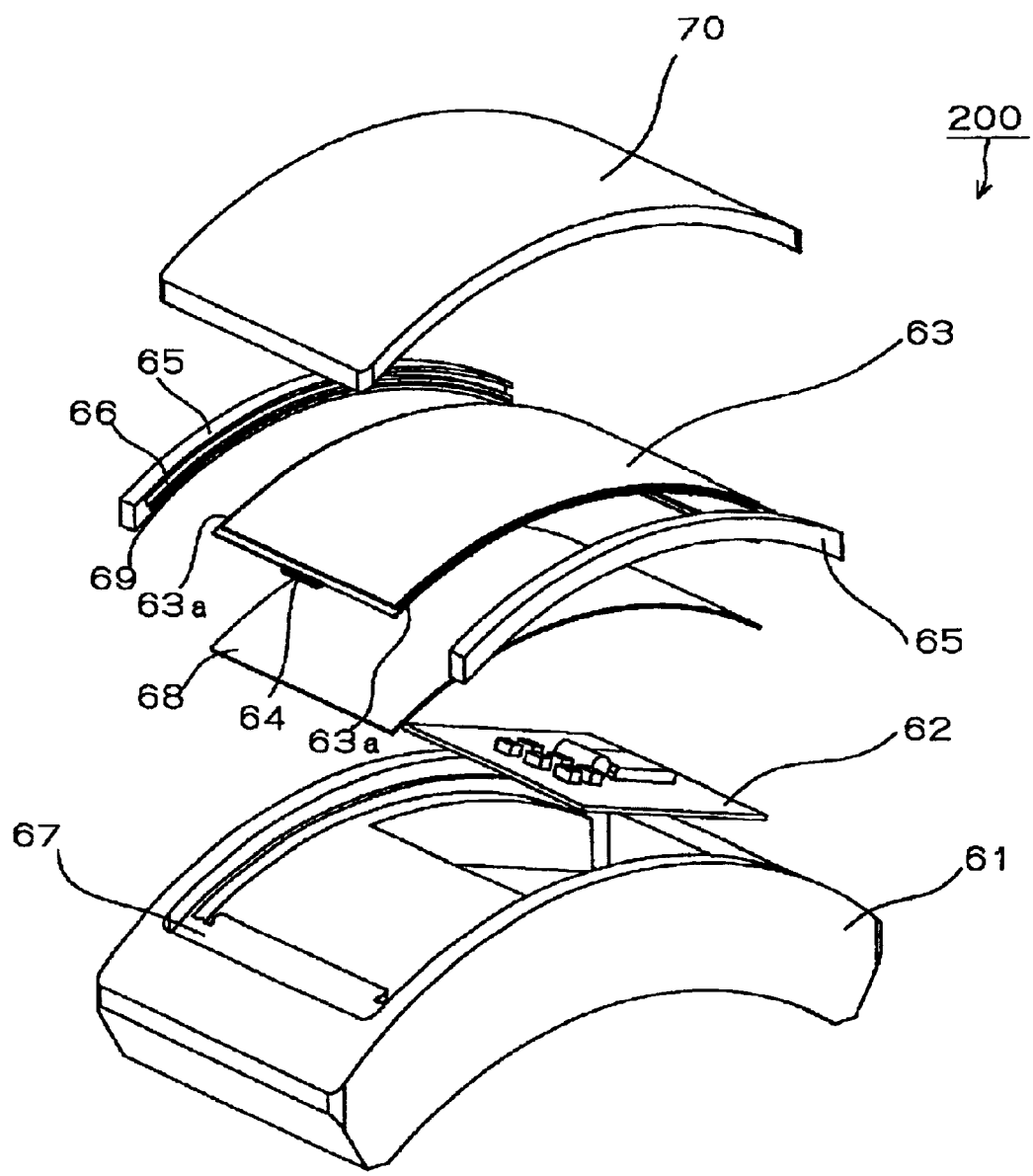
FIG. 8 is an assembly view showing a structure of a portable information apparatus according to a second embodiment of the present invention.
Figure 9:
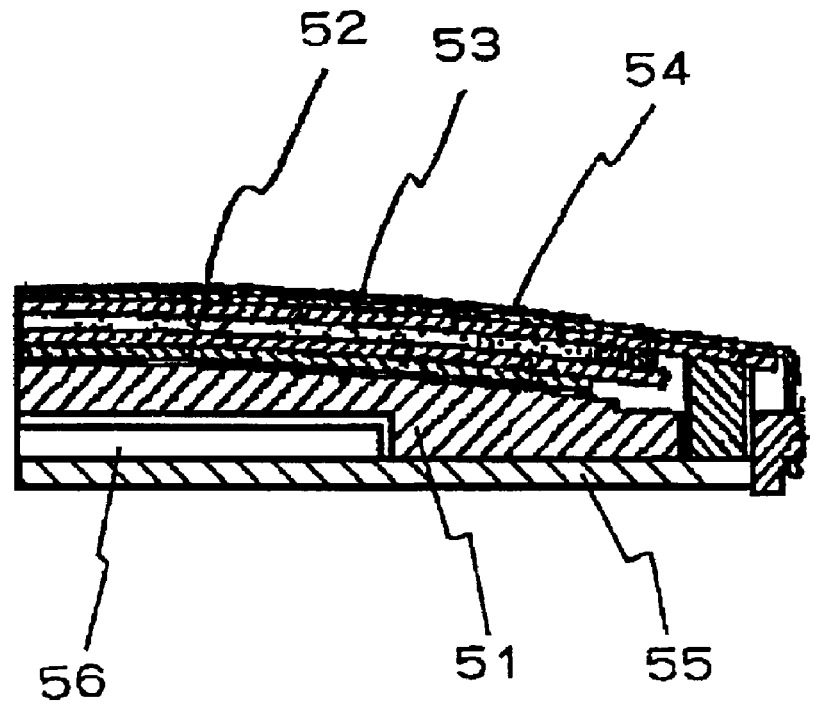
FIG. 9 is a cross sectional view showing an incorporation structure of a conventional film liquid crystal device.

FIG. 8 is an assembly view showing the structure of a portable information apparatus according to a second embodiment of the present invention. This portable information apparatus 200 includes: a case 61 having a curved shape; a circuit block 62 which is received in the inside of the case 61; and a film liquid crystal device 63 for carrying out the digital display. A sealing portion 64 of the film liquid crystal device 63 is provided on the side of a rectangular short side which is parallel with the curvature axis. For this reason, even if the film liquid crystal device 63 is curved to be held, since the short side portion is hardly curved, it is prevented that the curvature is impeded by the sealing portion and the cell gap of the liquid crystal becomes ununiform.

In addition, edge portions 63a of both sides of the film liquid crystal device 63 are respectively fitted in upper trenches 66 which are provided in a curved supporting member 65. Also, this supporting member 65 is made of a resin and is fixed to an attachment portion 67 which is provided on the inner side surface of the case 61. As for the method of fixing the supporting member 65 to the attachment portion 67, either the well known fitting structure or the bonding may be available.

In addition, an EL panel 68 for the lighting for the liquid crystal display is arranged on the lower side of the film liquid crystal device 63 (the illustration thereof is omitted). The both edges of the EL panel 68 are also fitted in lower trenches 69 of the supporting member 65, respectively, to be received in the case 61. The film liquid crystal device 63 and the EL panel 68 are connected to the circuit block 62 through a printed wiring film (not shown). Also, a curved cover glass 70 is fitted in the uppermost surface of the case 61. The film liquid crystal device 63 defines the gap between the cover glass 70 and the device 63 with the supporting member 65 being fixed to the attachment portion 67 and thus does not come in contact with the cover glass 70 at all.

Moreover, since a predetermined space is defined between the upper trenches 66 and the lower trenches 69, the EL panel 68 and the film liquid crystal device 63 does not come in contact with each other at all. For this reason, the film liquid crystal device 63 is hardly damaged by the vibration which is caused when attaching the device 63 or carrying the same. In addition, since the central portion of the film liquid crystal device 63 is held in a non-contact manner, the size of the cell gap is hardly changed. For this reason, it is possible to prevent the liquid crystal display from becoming difficult to be looked at. Note that, while the size of the above-mentioned gap is variously changed depending on the products to which the film liquid crystal device is applied and the design conditions, concretely, the range of about 0.2 to 1.5 mm is sufficient.

Note that, the structures of the above-mentioned first and second embodiments may be applied to portable telephones, portable music recording/reproducing apparatuses, digital cameras, portable game machines and the like as well as portable information apparatuses.

As described above, in the portable information apparatus according to the present invention, the sealing portion is provided in the straight line portions as the portions which are not curved when the film liquid crystal device is curved, whereby it is prevented that the sealing portion is impeded by the curvature. As a result, it is prevented that the cell gap becomes ununiform due to the provision of the sealing portion. In addition, when the film liquid crystal device is incorporated in the portable information apparatus, the incorporation work can be facilitated. Also, it is prevented that the curvature is impeded by the sealing portion and the gap becomes ununiform due to the provision of the sealing portion.

Moreover, in the portable information apparatus according to the present invention, the connection terminal portion of the film liquid crystal device is also provided in the straight line portions. Therefore, it is prevented that the curvature is impeded by the connection terminal portion and the gap becomes ununiform.

Furthermore, the sealing portion is provided in the straight line portions, whereby the sealing portion can be prevented from being damaged due to the impediment of easiness for the curvature when the film liquid crystal device is curved, or due to the application of the excessive stress to the sealing port when the film liquid crystal device is curved.

What is claimed is:

1. A portable information apparatus comprising: a film liquid crystal device having a pair of flexible substrates spaced apart from one another to define therebetween a gap containing liquid crystal, a plurality of first surface portions having a curved cross-section, a plurality of engagement portions extending from respective ones of the first surface portions, at least one second surface portion having a planar cross-section, an injection port formed in the at least one second surface portion and through which the liquid crystal is injected into the gap, and a sealing portion disposed on the at least one second surface portion for sealing the injection port; and a holding structure having a first holding member and a second holding member for holding the film liquid crystal device in a curved state while the at least one second surface portion of the film liquid crystal device remains planar in cross-section and while the first holding member engages the engagement portions of the liquid crystal device.

2. A portable information apparatus comprising: a film liquid crystal device having a pair of flexible substrates spaced apart from one another to define therebetween a gap containing liquid crystal, a plurality of first surface portions having a curved cross-section, a plurality of engagement portions extending from respective ones of the first surface portions, at least one second surface portion having a planar cross-section, an injection port formed in the at least one second surface portion and through which the liquid crystal is injected into the gap, and a connection terminal disposed on the at least one second surface portion for electrically connecting the film liquid crystal device to a circuit block; and a holding structure having a first holding member and a second holding member for holding the film liquid crystal device in a curved state while the at least one second surface portion of the film liquid crystal device remains planar in cross-section and while the first holding member engages the engagement portions of the liquid crystal device.

3. A portable information apparatus according to claim 1; wherein the at least one second surface portion comprises at least two second surface portions having a planar cross-section in the curved state of the film liquid crystal device, the sealing portion being disposed on one of the at least two second surface portions; and further comprising a connection terminal disposed on another of the at least two second surface portions for electrically connecting the film liquid crystal device to a circuit block.

4. A portable information apparatus according to claim 1; wherein the first holding member has a stepped portion for receiving the film liquid crystal device.

5. A portable information apparatus according to claim 2; wherein the first holding member has a stepped portion for receiving the film liquid crystal device.

6. A portable information apparatus according to claim 1; wherein the film liquid crystal device has at least two projection portions extending from respective first surface portions thereof; and wherein the first holding member has at least two trench portions for engagement with respective ones of the at least two projection portions of the film liquid crystal device so that a peripheral portion of the film liquid crystal device is disposed in an attachment portion of the first holding member to hold the film liquid crystal device in the curved state.

7. A portable information apparatus according to claim 2; wherein the film liquid crystal device has at least two projection portions extending from respective first surface portions thereof; and wherein the first holding member has at least two trench portions for engagement with respective ones of the at least two projection portions of the film liquid crystal device so that a peripheral portion of the film liquid crystal device is disposed in an attachment portion of the first holding member to hold the film liquid crystal device in the curved state.

8. A portable information apparatus according to claim 4; wherein the film liquid crystal device has at least two projection portions extending from respective first surface portions thereof; and wherein the first holding member has at least two trench portions for engagement with respective ones of the at least two projection portions of the film liquid crystal device so that a peripheral portion of the film liquid crystal device is disposed in an attachment portion of the first holding member to hold the film liquid crystal device in the curved state.

9. A portable information apparatus according to claim 5; wherein the film liquid crystal device has at least two projection portions extending from respective first surface portions thereof; and wherein the first holding member has at least two trench portions for engagement with respective ones of the at least two projection portions of the film liquid crystal device so that a peripheral portion of the film liquid crystal device is disposed in an attachment portion of the first holding member to hold the film liquid crystal device in the curved state.

10. A portable information apparatus comprising:

a film liquid crystal device having a pair of flexible substrates spaced apart from one another to define therebetween a gap containing liquid crystal, a first surface portion having a planar cross-section, an injection port formed in the first surface portion and through which the liquid crystal is injected into the gap, a sealing portion disposed on the first surface portion for sealing the injection port, a second surface portion having a planar cross-section, and a connection terminal disposed on the second surface portion for electrically connecting the film liquid crystal device to a circuit block; and a holding structure for holding the film liquid crystal device in a curved state while the first and second surface portions of the film liquid crystal device are generally parallel with a curvature axis of the film liquid crystal device.

11. A portable information apparatus according to claim 10; wherein the holding structure comprises a first holding member and a second holding member; and wherein the first holding member has a stepped portion for receiving the film liquid crystal device.

12. A portable information apparatus according to claim 11; wherein the film liquid crystal device has at least one projection extending from a surface portion thereof which does not correspond to the first and second surface portions; and wherein the first holding member has a trench portion for receiving the projection of the film liquid crystal device to prevent relative rotation between the first holding member and the film liquid crystal device.

* * * * *